United States Patent [19]

Willard, III

[11] Patent Number: 5,074,025

[45] Date of Patent: Dec. 24, 1991

[54] THREADED SHANK DRILL ASSEMBLY

[75] Inventor: Marcus C. Willard, III, Greenwood, S.C.

[73] Assignee: Jarvis Cutting Tools, Inc., Rochester, N.H.

[21] Appl. No.: 665,284

[22] Filed: Mar. 5, 1991

[51] Int. Cl.$^5$ .................. B23P 15/32; B23B 51/02
[52] U.S. Cl. .................................. 29/505; 29/525; 76/108.6; 279/103; 408/226; 408/239 A
[58] Field of Search .................. 408/226, 238, 239 R, 408/239 A; 279/96, 103; 29/505, 515, 520, 521, 525; 76/108.6

[56] References Cited

U.S. PATENT DOCUMENTS

| 3,053,118 | 9/1962 | Lavallee | 408/226 |
| 3,589,826 | 6/1971 | Fenn | 408/226 |

FOREIGN PATENT DOCUMENTS

| 561141 | 10/1923 | France | 408/226 |
| 8101761 | 11/1982 | Netherlands | 408/239 A |

OTHER PUBLICATIONS

*Machine Design: Theory and Practice,* Macmillan Publishing Co., Inc., 1975, pp. 98 and 870.
*Tool and Manufacturing Engineers Handbook,* vol. 1, Machining, SOciety of Manufacturing Engineers, 1984, pp. 3-6 and 3-7.

*Primary Examiner*—Daniel W. Howell
*Attorney, Agent, or Firm*—DeLio & Associates

[57] ABSTRACT

A combination drill and drill adapter comprises a drill having a shank portion for mounting the drill, and an adapter having an opening for receiving the drill. The drill shank is generally cylindrical in shape and, at a portion adjacent to an end of the drill, includes a plurality of substantially flat sides parallel to the longitudinal axis of the drill extending along at least a portion of the shank. The drill adapter opening has a depth greater than the length of the flat sides of the drill for receiving the drill shank end portion. A mounting member is at the opposite end for mounting the adapter in a drilling device. The adapter opening has a first diameter at the portion of the opening away from the end less than the diameter of the drill shank cylindrical portion and greater than that of the diameter of a circle tangential to the sides at the end of the drill shank, and a second diameter at the portion of the opening adjacent the end greater than the first diameter and slightly less than that of the drill shank cylindrical portion. The drill shank end is assembled into the adapter opening such that the sides of the drill shank end broach walls of said adapter opening at the first diameter away from the adapter end and the drill shank cylindrical portion fits against walls of the adapter opening at the second diameter adjacent to the adapter end without broaching to hold the drill securely in the adapter for mounting of the assembled drill and adapter in a drilling device.

11 Claims, 2 Drawing Sheets

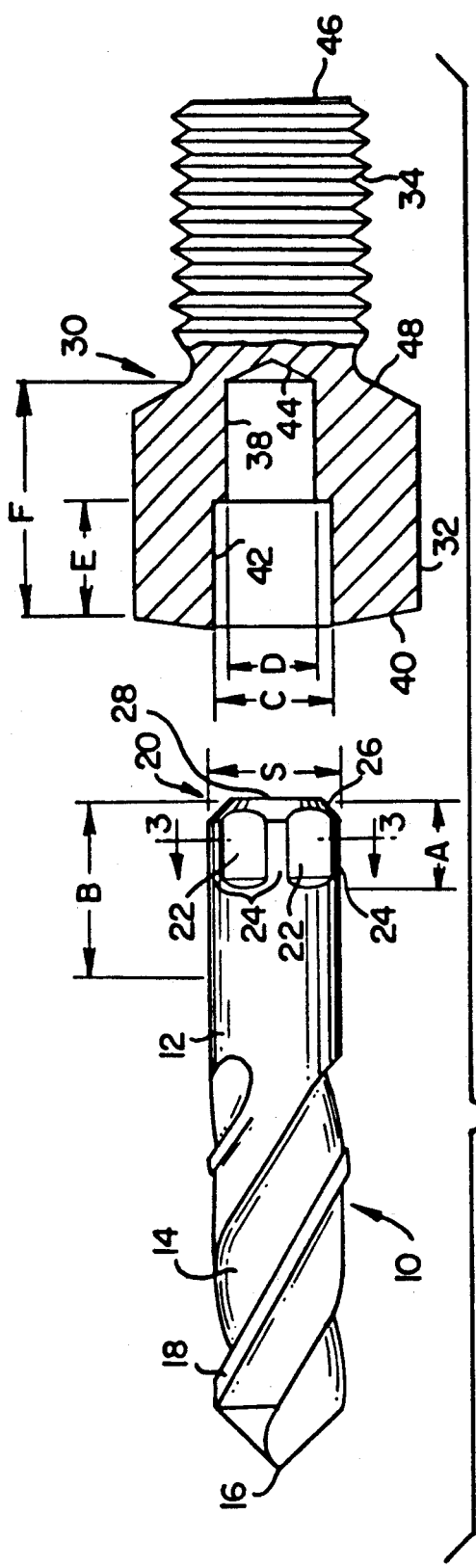
FIG. 2
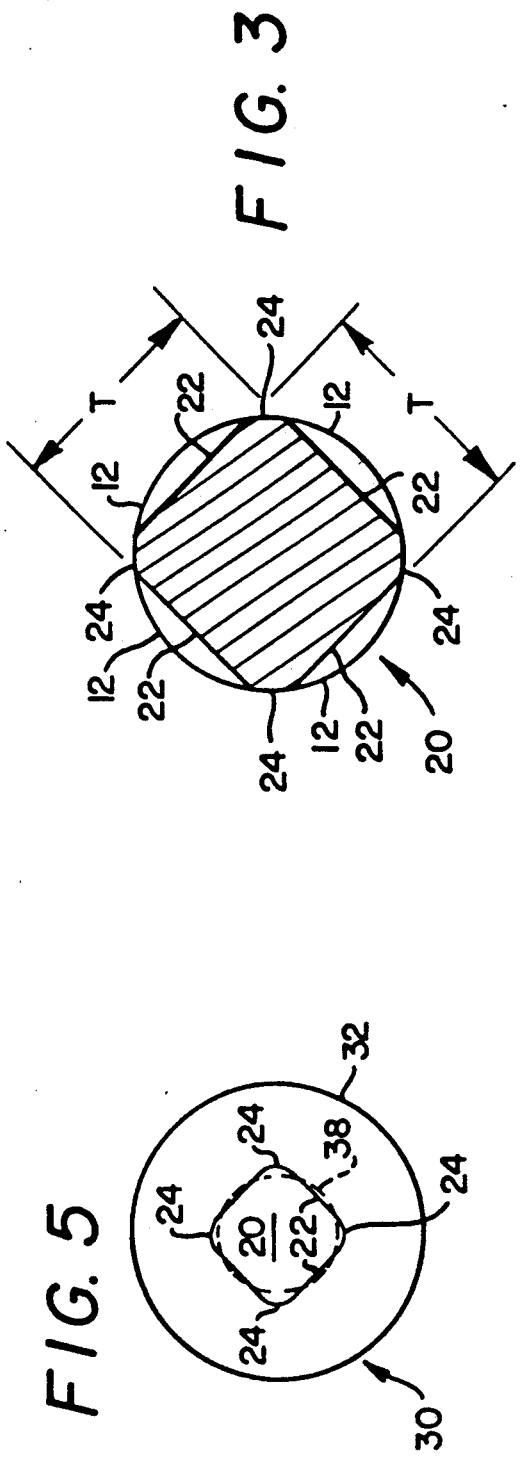
FIG. 3
FIG. 5

THREADED SHANK DRILL ASSEMBLY

BACKGROUND OF THE INVENTION

This invention pertains to combination drill and drill adapters and, in particular, to metal cutting drills fitted into threaded shank adapters for high torque applications.

Twist drills for metal cutting and other applications are normally made of appropriate steel or other alloys, such as high speed tool steels. For normal applications, the drill shank (the end opposite the drill cutting tip) is of cylindrical configuration for mounting into a conventional chuck of a drilling machine which consists of a plurality of jaws which tighten around the drill shank to hold it securely in place. In certain high torque applications, the tight fit between the chuck and the drill shank is insufficient to prevent the drill shank from rotating relative to the chuck. Drill shank adapters have been utilized for ease of changing, weight and space considerations, but have not solved the problem of slippage. Drill shank adapters in the past have had low torque capabilities and, consequently, their use has been restricted primarily to aluminum applications.

One conventional manner of mating of the drill shank and adapter has been by brazing. The temperature needed to melt conventional brazing alloys can be 800° F. or more, depending on the brazing alloy and drill and adapter materials employed. Because the drill is normally made of a heat treated steel or other alloy, these temperatures can cause a marked change and deterioration in the properties of both the drill bit and the threaded shank adapters (including the threaded areas for mating into the chuck). Such temperatures may result in undesired tempering of the drill shank and/or the cutting edges of the drills, which lowers the hardness and cutting properties of the drill, and has an adverse impact upon the metallurgical and mechanical properties of the shank adapters. Stress relieving or other heat treatment of the tools may be employed after the brazing process to avoid some of the aforementioned problems, but such treatment may also weaken the brazing bond since it may be carried out near the melting point of the brazing alloy.

Furthermore, brazing and subsequent heat treatments add cost and complexity to the drill assembly operations and may have a detrimental effect upon the safety of workers and environmental considerations as a whole. Also, the brazing and other heat treatments leave a dull finish, which is not the desirable condition when used to drill certain materials such as aluminum.

Press or interference fitting of the drill bit shank into the adapter hole is an alternative to brazing. When the degree of interference fit (i.e., the diameter mismatch between the drill shank diameter and the adapter hole diameter) and the depth of penetration of the drill shank into the adapter hole are carefully selected, it may be possible to produce a threaded shank drill assembly in the smaller sizes with only minor straightening adjustment required after fitting. However, for drill bits of larger sizes, e.g., drill diameter larger than No. 30 (0.1285 in.), press or interference fitting is generally less successful in that torque specifications as defined by National Aerospace Standard (NAS) 965 could not be met consistently.

Additionally, if the interference was increased by making the drill shank considerably larger than the adapter hole to enhance torque strength, the drill bits and adapters became bent and many of the threaded shank adapters split or ruptured. Furthermore, the excessive press loads required to successfully press the drill shank into the threaded shank adapter to meet the higher torque specifications can cause misalignment of the press head on the adapting machine and yield a threaded shank drill assembly with extreme axial misalignment (runout).

In view of the aforementioned problems, it is therefore an object of the present invention to provide a combination drill and drill adapter which is particularly suited for high torque applications in drilling metals and other materials.

It is another object of the present invention to provide a combination drill and drill adapter which may be assembled without causing damage and deterioration of material properties normally encountered as a result of the high temperatures employed in brazing.

It is a further object of the present invention to provide an improved threaded shank drill which can be assembled without damage to the drill bit or adapter.

It is yet another object of the present invention to provide a high torque drill adapter in which both the drill bit and adapter retain high hardness levels.

It is a further object of the present invention to provide a process for fitting a drill bit into a drill adapter which avoids damage to the machinery for making the finished tool.

It is another object of the present invention to provide a non-brazing alternative to press or interference fitting of drill bits into shank adapters which avoids damage to the tool and its components.

It is a further object of the present invention to provide a threaded shank drill adapter with reduced runout.

SUMMARY OF THE INVENTION

The above and other objects, which will be apparent to those of ordinary skill in the art, are achieved in the present invention which provides a drill bit which may be fitted into a drill adapter without brazing and the problems associated therewith while still retaining optimum metallurgical qualities of the drill bit and adapter and achieving high torque capabilities and high precision in the assembled tool.

In one aspect, the present invention relates to a combination drill and drill adapter comprising a drill having a shank portion for mounting the drill and a drill adapter having a circular opening in one end for receiving the drill shank end portion. The drill shank is straight and generally cylindrical in shape and has, at a portion adjacent to an end of the drill, a plurality of substantially flat sides parallel to the longitudinal axis of the drill forming voids in the cylindrical shape. The adapter opening has a diameter less than the diameter of the drill shank cylindrical portion and at least that of the diameter of a circle tangential to the sides at the end of the drill shank. At the end opposite the circular opening, the drill adapter has a member for mounting the adapter in a drilling device. The drill and adapter are assembled by axially aligning the two and pressing the drill shank end into the adapter opening such that the walls of the adapter opening are broached by the sides of the drill shank end to hold the drill securely in the adapter for mounting of the assembled drill and adapter in a drilling machine or device.

Preferably, the invention relates to a combination drill and drill adapter comprising a drill having a shank portion for mounting the drill, the drill shank being generally cylindrical in shape and, at a portion adjacent to an end of the drill, a plurality of substantially flat sides parallel to the longitudinal axis of the drill extending along at least a portion of the shank. The drill adapter has a circular opening in one end with a depth greater than the length of the flat sides of the drill for receiving the drill shank end portion. The adapter opening has a first diameter at the portion of the opening away from the end less than the diameter of the drill shank cylindrical portion and greater than that of the diameter of a circle tangential to the sides at the end of the drill shank. The adapter opening also has a second diameter at the portion of the opening adjacent the end greater than the first diameter and slightly less than that of the drill shank cylindrical portion. A mounting member is at the end of the adapter opposite the opening for mounting the adapter in a drilling device. The drill and adapter are assembled by axially aligning the two and pressing the drill shank end into the adapter opening such that the sides of the drill shank end broach walls of the adapter opening at the first diameter away from the adapter end and the drill shank cylindrical portion fits against walls of the adapter opening at the second diameter adjacent to the adapter end without broaching to hold the drill securely in the adapter for mounting of the assembled drill and adapter in a drilling device.

In the method aspect of the present invention, the drill and adapter may be prepared with the features described above by conventional and well known machining techniques prior to assembly.

In another aspect, the present invention relates to a threaded shank drill for high torque loading applications which includes an adapter portion having a hole in a first end and a threaded shank on a second end, opposite the first end, for mounting the drill in a drilling machine. A drill portion has a cylindrical shape with a drill tip at a first end and a plurality of flat sides around an opposite, second end, the second end having corners at regions between the flat sides. The second end of the drill portion is secured within the hole of the adapter portion by a tight fit between the drill portion corners and the adapter hole. The shape of the adapter hole conforms substantially to the shape of the second end of the drill portion as seen in a plane perpendicular to the longitudinal axis of the drill.

The preferred form of this aspect of the invention relates to a threaded shank drill for high torque loading applications which includes an adapter portion having a hole of a predetermined depth in a first end and a threaded shank on a second end, opposite the first end, for mounting the drill in a drilling machine. The adapter hole has a plurality of diameters with a larger diameter near the top of the hole and a smaller diameter near the bottom of the hole. A drill portion has a cylindrical shape of a diameter slightly larger than the hole larger diameter with a drill tip at a first end and a plurality of flat sides around an opposite, second end. The flat sides are tangential to a circle of diameter smaller than the hole smaller diameter. The second end of the drill portion has corners at regions between the flat sides and is secured within the hole of the adapter portion by a tight fit between the drill portion corners and walls at the bottom of the adapter hole and between the cylindrical drill portion and walls at the top of the adapter hole. The shape of the adapter hole near the bottom conforms substantially to the shape of the second end of the drill portion as seen in a plane perpendicular to the longitudinal axis of the drill.

In a further aspect, the present invention relates to a threaded shank drill for high torque loading applications which comprises an adapter portion having a hole of predetermined diameter in a first end and a threaded shank on a second end, opposite the first end, for mounting the drill in a drilling machine; and a drill portion of hardness greater than the adapter portion having a cylindrical shape with a drill tip at a first end and a plurality of sides around an opposite, second end, the second end having corners at regions between the sides, the corners extending beyond the diameter of the adapter hole. The drill portion second end is assembled into the adapter opening such that the walls of the adapter hole are broached by the corners of the drill portion second end to hold the drill portion securely in the adapter for mounting of the assembled drill and adapter portions in a drilling device.

In a preferred form of this further aspect, the adapter portion has a hole of a predetermined diameter and depth in a first end and a threaded shank on a second end, opposite the first end, for mounting the drill in a drilling machine. The adapter hole has a plurality of diameters with a larger diameter near the top of the hole and a smaller diameter near the bottom of the hole. The drill portion is of hardness greater than the adapter portion and has a cylindrical shape of a diameter slightly larger than the hole larger diameter with a drill tip at a first end and a plurality of sides around an opposite second end, the second end of the drill portion having corners at regions between the sides, the corners extending beyond the smaller diameter of the adapter hole. The drill portion second end is assembled into the adapter opening such that the corners of the drill portion second end broach walls of the adapter hole at the smaller diameter near the bottom of the hole and the cylindrical drill portion fits against walls of the adapter hole at the larger diameter at the top of the hole without broaching to hold the drill portion securely in the adapter for mounting of the assembled drill and adapter portions in a drilling device.

For optimum performance, the drill body preferably has a hardness greater than about RC 60, more preferably greater than about RC 65, and the adapter has a hardness greater than about RC 20, more preferably greater than about RC 25.

BRIEF DESCRIPTION OF THE DRAWINGS

FIG. 2 is a side view of a more preferred embodiment, partially cut away and in cross-section, showing a drill bit having a squared off shank end prior to insertion in to an adapter having multiple hole diameters.

FIG. 3 is an axial cross-sectional view of the drill shank through the squared off end along lines 3—3 of FIG. 2.

FIG. 4 is a side view, partially cut away in cross-section, showing the drill bit and adapter of FIG. 2 after assembly.

FIG. 5 is an axial cross-sectional view of the drill bit shank pressed into the smaller diameter of the adapter along lines 5—5 of FIG. 4.

DETAILED DESCRIPTION OF THE INVENTION

Figure 1:
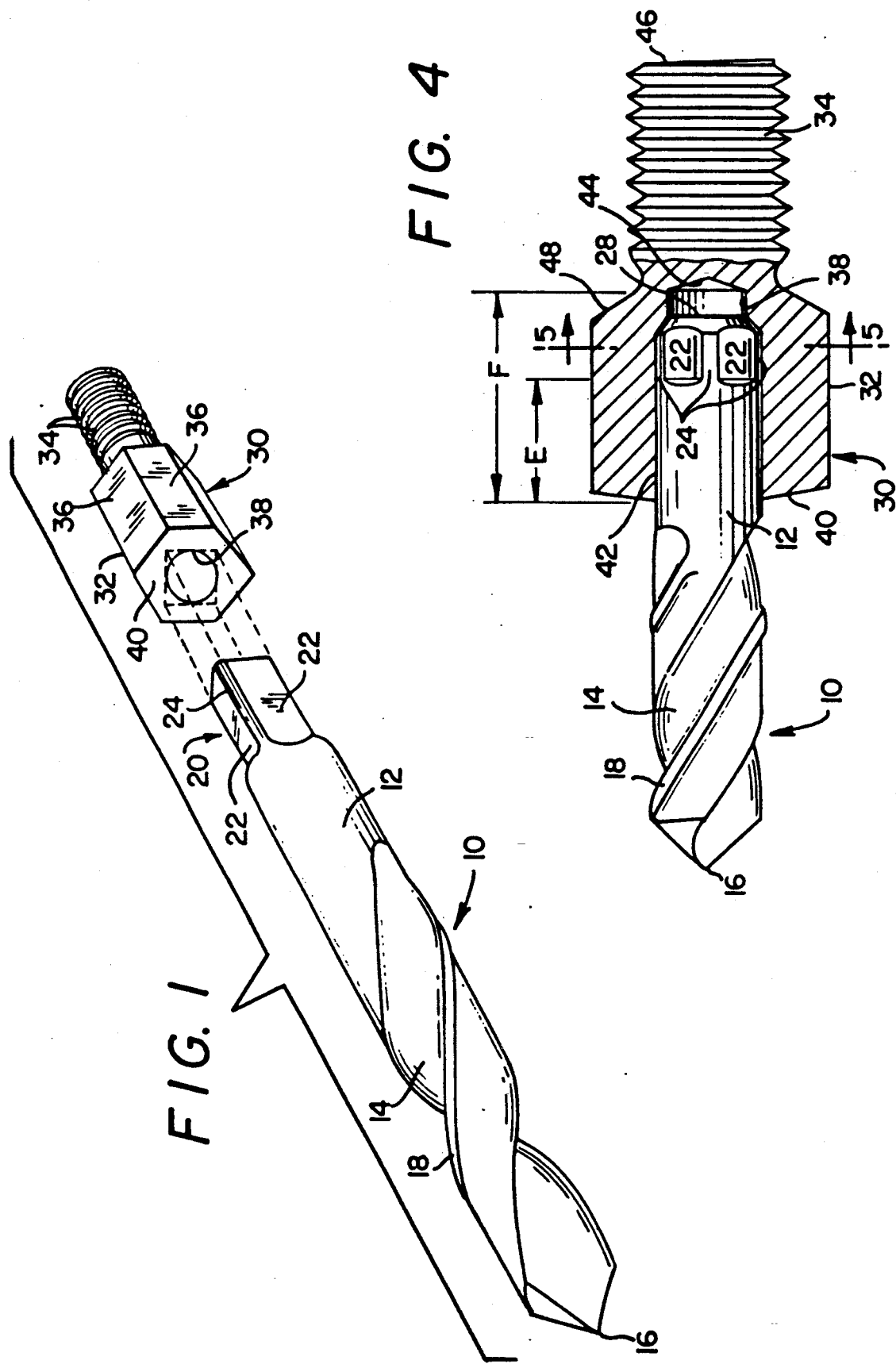
FIG. 1 is a perspective view of a first embodiment of the present invention in which a squared off shank end of a drill bit is fitted into the hole in a threaded adapter.

The preferred embodiments of the present invention are depicted in the drawings in FIGS. 1 through 5 in which like numerals refer to like features of the invention. The drill bit may be configured to drill any types of materials such as metals, wood, plastic or the like, although this invention is particularly directed toward drilling of metals. The drill bit and adapter of the present invention may be made of any conventional materials normally employed for such applications. In the case of the drill bit, tool steel such as high speed steels or other alloys with good cutting characteristic can be employed. In the case of the adapter, high carbon and alloy steels may be employed. In all instances, the drill bit and adapter may be manufactured to the configurations and specifications described herein by conventional machining and other processes which are well known in the art.

A first embodiment of the present invention is depicted in FIG. 1 in which a drill or drill bit 10 has a drill body 12 of conventional straight cylindrical shape. The cutting end of drill 10 has a cutting tip 16 and sharpened cutting edge 18 on the outer portions of helical flutes 14. Depending on the application, any other suitable drill flute configuration may be used in the present invention.

In accordance with the present invention, the drill embodiment depicted in FIG. 1 includes drill shank 20 in which the portion adjacent to the end has multiple sides, in this instance being shown as a "squared off" end having four (4) substantially flat sides 22 ground or otherwise formed into the drill body 12. In place of the squared off end depicted here, the present invention contemplates that any other number of a plurality of sides may be formed into the end of drill shank 20, the sides being substantially parallel to the longitudinal axis of drill 10. While the sides 22 are shown to be substantially planar, it is to be understood that minor deviation from a flat or plane conditions are within the scope of this invention. Where the number of sides employed is an even number, as shown in FIG. 1, opposed sides should generally be parallel to one another.

Corners 24 extend longitudinally between adjacent sides 22. As shown in the FIGURE, these corners 24 comprise a portion of the original surface of cylindrical drill body 12 and, consequently, are rounded in shape. Optionally, these corners may be made sharp by further grinding of the sides 22.

The drill adapter 30 depicted in FIG. 1 comprises an adapter body 32 and, at one end, a threaded member 34 for screwing the adapter into the desired drilling machine or device. The threads are generally of a standard, well known configuration for use in a wide variety of applications. At the end opposite threads 34, the adapter body includes a top surface 40 having therein an opening or hole 38 for receiving the end of drill shank 20. Hole 38 extends along the longitudinal axis of adapter body 32, axially aligned with threaded member 34, and is of a diameter at least as great as the diameter of a circle tangential to the sides at the end of drill shank 20 (as seen in an axial plane perpendicular to the longitudinal axis of the drill). In the embodiment shown in FIG. 1, hole 38 has a diameter equal to the circle tangential to sides 22 of drill 10. The diameter of hole 38 may be greater than that of the tangential circle, but should be less than the diameter of the drill body so that the corners 24 extend beyond the diameter of the adapter hole 38.

In accordance with the preferred method of the present invention, the drill bit 10 and adapter 30 are assembled by axially aligning the longitudinal axes of the drill bit and adapter, and pressing the two (2) together. Because the drill is normally made from a harder material, the walls of adapter opening 38 are broached by the sides 22 and, particularly, corners 24 at the shank end 20 of the drill bit. The adapter wall material which is broached by the sides and corners of drill shank end 20 is extruded downward toward the bottom of adapter hole 38. This force fitting of the portions of the drill shank overlapping the area of the adapter outside of the opening 38 (as shown in phantom lines) causes the adapter to be cut and plastically deformed such that the adapter opening takes on substantially the shape of the shank end of drill 10 as would be seen in an axial cross section perpendicular to the longitudinal axis of the drill. The result of this is that the shank corners 24 are tightly fitted against the re-formed adapter hole to securely mount the drill and hold it in place in the adapter.

Adapter hole 38 is of sufficient depth or length such that the multi-sided end of drill shank 20 may penetrate to the distance required to securely hold the drill bit in place in the adapter and meet desired torque and other performance characteristic. As a result of the broaching action of the end of drill shank 20, the adapter hole 30 is squared off for the length of the press depth. Consequently, the drill bit 10 is able to resist slippage within adapter 30 as the combined threaded shank drill assembly is subjected to high torque loading.

Where the adapter hole is made to the same diameter as a circle tangential to the drill shank sides 22, the adapter hole should have additional depth to accommodate the excess, deformed metal below the seated drill. Where the adapter hole is of diameter larger than a circle tangential to the drill shank sides 22, the excess material is also deformed into the space between the drill shank sides 22 and the original wall of adapter hole 38.

The use of the shank end of the drill as a cutting or broaching tool places less stress on the adapter and results in less chance of splitting the adapter than alternative methods which rely on press fitting highly mismatched cylindrical drill shank ends into round adapter hole without any broaching action. This technique may also result in a smaller hole depth in the adapter. The small radius on the corners between the flat sides 22 serves to assure better TIR when the drill is pressed into the adapter.

In accordance with the method of the present invention associated with the embodiment in FIG. 1, the appropriate drill and adapter may be prepared or obtained by conventional metal cutting and forming methods and fitted into one another in a press in the manner indicated.

Although the embodiment depicted in FIG. 1 has considerable advantages over brazing and (non-broaching) interference press fitting methods, additional advantages may be obtained by utilizing a multiple diameter hole in the adapter as depicted in the embodiment shown in FIGS. 2-5. As best shown in FIG. 2 in this more preferred embodiment, the drill 10 includes a shank end 20 of configuration similar to that shown in FIG. 1. with a chamfered portion 26 adjacent to end face 28 and a drill body and shank diameter S. The flat sides 22 extend longitudinally along the drill 10 for a distance A. The entire shank end intended to be inserted and held by the adapter is of length B as shown.

As shown in FIG. 3 in an axial cross section through the multi-sided end of drill shank 20, the cylindrical body 12 of drill bit 10 is ground to produce four (4) substantially flat sides 22. Opposed sides 22 are essentially parallel to each other and to the longitudinal axis of drill 10. Opposed sides 22 are separated by a distance T, which is also the diameter of the imaginary circle tangential to the sides 22. The sides 22 are ground such that rounded corner 24 remain between adjacent sides which conform to the original surface of drill body 12. In accordance with this invention, these corners 24 may be made to any desired configuration, whether sharp or rounded, as long as they are able to broach the walls of the adapter opening upon pressing the drill into the adapter. Also, the number of sides formed at the shank end can vary from the four (4) described herein.

The adapter 30 in the preferred embodiment has an outer configuration similar to that shown in FIG. 1. However, the opening in the adapter has two (2) different diameters. Hole portion 38 at the bottom of the adapter opening receives the squared off end of drill shank 20 and has a diameter D which is at least equal to the diameter of a circle tangential to the sides 22 at the end of drill shank 20, and is preferably somewhat larger than the tangential circle, but less than the diameter S of the drill shank and body. Diameter D should be equal to or greater than dimension T (FIG. 3) so that the corners 24 extend beyond the diameter D of hole portion 38.

At the top of the adapter opening is hole portion 42 of diameter C, which is larger than diameter D of hole 38. Hole 42 is of cylindrical configuration and is intended to receive the cylindrical portion of drill shank end 20 above the multi-sided end portion (to the left as shown in FIG. 2) in a tight interference or press fit without broaching. Accordingly, hole 42 diameter C is no greater than, and is preferably slightly less than, diameter S of drill body 12. The difference between the diameters C and S determines the tightness of the interference fit between the cylindrical body of the drill bit 10 and the hole 42.

The length or depth of the hole portions 42 and 38 are sized to correspond to the shank side lengths A and B of drill bit 10. Hole 42 has length E which should be approximately the distance B minus A on the drill shank end. Hole length 38 is F minus E and should be as least as great as length A of sides 22. The total depth F of holes 42 and 38 should be as least as great as length B of drill shank 20. For a typical no. 10 drill size, dimension A is about 0.125 in., dimension B is about 0.250 in., dimension E is about 0.125 in. and dimension F is about 0.275 in.

In the method aspect of this preferred embodiment, a press or other device (not shown) axially aligns the drill 10 with adapter 30 as seen in FIG. 2 and the two are pressed together such that the shank end of the drill 10 enters the adapter opening. During fitting of the drill into the adapter opening, the sides 22 and corners 24 of drill shank end 20 broach the walls of hole 38 and extrude excess metal from the walls into any void areas adjacent to the sides and toward the bottom of the hole. It is desirable to make hole 38 sufficiently deep to accommodate any excess metal beyond the fully seated end face 28 of the drill. As the sides and corners of the drill shank end are broaching and re-forming hole 38, the drill body 12 cylindrical portion adjacent to and above the sides 22 slides tightly against the walls of adapter opening 42 without substantial broaching to assist in holding the drill securely in the adapter opening.

The assembled combination drill and threaded shank adapter of the preferred embodiment is depicted in FIG. 4 wherein the shank end of drill 10 is seated within the multiple diameter opening of adapter 30 to a depth somewhat less than the full length F of the opening. Drill end face 28 is spaced from the bottom 44 of opening 38 to accommodate any material deformed during broaching (not shown). The cylindrical portion of drill shank 20 above the sides 22 is seated essentially fully within the length E of hole 42 without substantial plastic deformation or broaching of the hole walls.

An axial cross section through the drill shank sides is depicted in FIG. 5 and shows the fitting of the multi-sided drill shank end 20 within the original adapter hole portion 38 (shown in phantom lines). Because of the broaching action of the walls and corners on the end of the drill 10, the corners 24 are now fitted tightly against the newly formed walls of that portion of the adapter opening and the reformed shape of the adapter hole near the bottom conforms substantially to the shape of the multi-sided drill shank end. The material deformed by the broaching operation is shown filling any void areas between sides 22 and original hole walls 38. The degree to which these void areas are filled depends on the location, the drill and adapter opening dimensions, and their material properties. As such, these void areas maybe filled with extruded metal to a degree less than shown.

A list of recommended drill and adapter hole dimensions for drill sizes larger than No. 30 is given in Table 1. The drill size and nominal drill body diameter S are given in the first two columns. The column labeled "Hole Diameter" gives the recommended diameters D of the smaller hole portion (38) and the column labeled "C'Bore Dia." gives the recommended diameters C of the larger hole portion (42). The column labelled "Square Size" gives the dimension T of the squared off drill shank end. The last two columns, "Use Drill" and "Use C'Bore" give the recommended drill sizes to drill the adapter holes of diameters D and C, respectively. Unless otherwise stated, all dimensions shown in Tables 1 and 2 are in inches.

TABLE 1

THREADED SHANK ADAPTER DESIGN TABLE FOR NAS 965 DRILLS WITH "SQUARED SHANK"

| T.S.TOOL TYP/SIZE | NOMINAL DIA | HOLE DIAMETER* | | C'BORE DIA.** | | SQUARE SIZE | | USE DRILL |
|---|---|---|---|---|---|---|---|---|
| | | MAX | MIN | MAX | MIN | MAX | MIN | |
| #30 STUB | 0.1285 | 0.121 | 0.119 | 0.126 | 0.124 | 0.097 | 0.101 | 0.120 |
| #30 L-S | 0.1285 | 0.121 | 0.119 | 0.126 | 0.124 | 0.097 | 0.101 | 0.120 |
| #29 L-S | 0.1360 | 0.128 | 0.126 | 0.133 | 0.131 | 0.103 | 0.106 | 0.132 |
| #28 l-s | 0.1405 | 0.133 | 0.131 | 0.138 | 0.136 | 0.106 | 0.109 | 0.132 |
| 9/64 L-S | 0.1406 | 0.133 | 0.131 | 0.138 | 0.136 | 0.106 | 0.109 | 0.132 |
| #27 L-S | 0.1440 | 0.136 | 0.134 | 0.141 | 0.139 | 0.108 | 0.112 | 0.135 |

TABLE 1-continued
THREADED SHANK ADAPTER DESIGN TABLE FOR NAS 965 DRILLS WITH "SQUARED SHANK"

| T.S.TOOL TYP/SIZE | NOMINAL DIA | HOLE DIAMETER* MAX | HOLE DIAMETER* MIN | C'BORE DIA.** MAX | C'BORE DIA.** MIN | SQUARE SIZE MAX | SQUARE SIZE MIN | USE DRILL |
|---|---|---|---|---|---|---|---|---|
| #26 L-S | 0.1470 | 0.139 | 0.137 | 0.144 | 0.142 | 0.110 | 0.114 | 0.138 |
| #25 L-S | 0.1495 | 0.141 | 0.140 | 0.147 | 0.145 | 0.112 | 0.116 | 0.141 |
| #24 L-S | 0.1520 | 0.144 | 0.142 | 0.149 | 0.147 | 0.114 | 0.117 | 0.143 |
| #23 L-S | 0.1540 | 0.146 | 0.144 | 0.151 | 0.149 | 0.115 | 0.119 | 0.145 |
| 5/32 L-S | 0.1562 | 0.148 | 0.146 | 0.153 | 0.151 | 0.117 | 0.120 | 0.147 |
| #22 L-S | 0.1570 | 0.149 | 0.147 | 0.154 | 0.152 | 0.117 | 0.121 | 0.148 |
| #21 L-S | 0.1590 | 0.151 | 0.149 | 0.156 | 0.154 | 0.119 | 0.122 | 0.150 |
| #20 STUB | 0.1610 | 0.153 | 0.151 | 0.158 | 0.156 | 0.120 | 0.124 | 0.152 |
| #20 L-S | 0.1610 | 0.153 | 0.151 | 0.158 | 0.156 | 0.120 | 0.124 | 0.152 |
| #19 L-S | 0.1660 | 0.158 | 0.156 | 0.163 | 0.161 | 0.124 | 0.127 | 0.157 |
| #18 L-S | 0.1695 | 0.162 | 0.160 | 0.167 | 0.165 | 0.126 | 0.130 | 0.161 |
| 11/64 L-S | 0.1719 | 0.164 | 0.162 | 0.169 | 0.167 | 0.128 | 0.131 | 0.163 |
| #17 L-S | 0.1730 | 0.165 | 0.163 | 0.170 | 0.168 | 0.129 | 0.132 | 0.164 |
| #16 L-S | 0.1770 | 0.169 | 0.167 | 0.174 | 0.172 | 0.132 | 0.135 | 0.168 |
| #15 L-S | 0.1800 | 0.172 | 0.170 | 0.177 | 0.175 | 0.134 | 0.137 | 0.171 |
| #14 L-S | 0.1820 | 0.174 | 0.172 | 0.179 | 0.177 | 0.135 | 0.139 | 0.173 |
| #13 L-S | 0.1850 | 0.177 | 0.175 | 0.182 | 0.180 | 0.137 | 0.141 | 0.176 |
| 3/16 L-S | 0.1875 | 0.180 | 0.178 | 0.185 | 0.183 | 0.139 | 0.142 | 0.179 |
| #12 L-S | 0.1890 | 0.181 | 0.179 | 0.186 | 0.184 | 0.140 | 0.144 | 0.180 |
| #11 L-S | 0.1910 | 0.183 | 0.181 | 0.188 | 0.186 | 0.141 | 0.145 | 0.182 |
| 310 STUB | 0.1935 | 0.186 | 0.184 | 0.191 | 0.189 | 0.143 | 0.147 | 0.185 |
| #10 L-S | 0.1935 | 0.186 | 0.184 | 0.191 | 0.189 | 0.143 | 0.147 | 0.185 |
| #9 L-S | 0.1960 | 0.188 | 0.186 | 0.193 | 0.191 | 0.145 | 0.148 | 0.187 |
| #8 L-S | 0.1990 | 0.191 | 0.189 | 0.196 | 0.194 | 0.147 | 0.151 | 0.190 |
| #7 L-S | 0.2010 | 0.193 | 0.191 | 0.198 | 0.196 | 0.148 | 0.152 | 0.192 |
| 13/64 L-S | 0.2030 | 0.195 | 0.193 | 0.200 | 0.198 | 0.150 | 0.153 | 0.194 |
| #6 L-S | 0.2040 | 0.196 | 0.194 | 0.201 | 0.199 | 0.151 | 0.154 | 0.195 |
| #5 L-S | 0.2055 | 0.198 | 0.196 | 0.203 | 0.201 | 0.152 | 0.155 | 0.197 |
| #4 L-S | 0.2090 | 0.201 | 0.199 | 0.206 | 0.204 | 0.154 | 0.158 | 0.200 |
| #3 L-S | 0.2130 | 0.205 | 0.203 | 0.210 | 0.208 | 0.157 | 0.161 | 0.204 |
| 7/32 L-S | 0.2187 | 0.211 | 0.209 | 0.261 | 0.214 | 0.161 | 0.165 | 0.210 |
| 32 L-S | 0.2210 | 0.213 | 0.211 | 0.218 | 0.216 | 0.163 | 0.166 | 0.212 |
| #1 L-S | 0.2280 | 0.220 | 0.218 | 0.225 | 0.223 | 0.168 | 0.171 | 0.219 |
| A L-S | 0.2340 | 0.226 | 0.224 | 0.231 | 0.229 | 0.172 | 0.175 | 0.225 |
| 15/64 L-S | 0.2344 | 0.226 | 0.224 | 0.231 | 0.229 | 0.172 | 0.176 | 0.225 |
| B L-S | 0.2380 | 0.230 | 0.228 | 0.235 | 0.233 | 0.175 | 0.178 | 0.229 |
| C L-S | 0.2420 | 0.234 | 0.232 | 0.239 | 0.237 | 0.177 | 0.181 | 0.233 |
| D L-S | 0.2460 | 0.238 | 0.236 | 0.243 | 0.241 | 0.180 | 0.184 | 0.237 |
| 1/4 STUB | 0.2500 | 0.242 | 0.240 | 0.247 | 0.245 | 0.183 | 0.187 | 0.241 |
| 1/4 L-S | 0.2500 | 0.242 | 0.240 | 0.247 | 0.245 | 0.183 | 0.187 | 0.241 |
| F L-S | 0.2570 | 0.242 | 0.240 | 0.247 | 0.245 | 0.183 | 0.187 | 0.241 |
| G L-S | 0.2610 | 0.240 | 0.240 | 0.247 | 0.245 | 0.183 | 0.187 | 0.241 |
| 5/16 L-S | 0.3125 | 0.242 | 0.240 | 0.247 | 0.245 | 0.183 | 0.187 | 0.241 |

The broaching operation in accordance with the present invention creates a socket in the adapter that fits the multi sided end of the drill shank with resulting superior torque over unbroached interference fitting. The void areas created on the shank by the flat sides allow the extruded adapter wall material to fill around the flats and alleviate radial stress on the adapter. Because of the reduction in radial stress, the axial force required to fit the drill and adapter together is reduced, which consequently eliminates the need for excessive clamping pressure and reduces the possibility of damage to the drill structure during the fitting operation. This also reduces deflection of the load bearing structures in the press used to fit the drill and adapter together, which enables the assembled combined drill and threaded shank adapter to be produced with reduced runout.

Additionally, the increased torque handling capability of the assembled drill and adapter permits the center line of the drill to be used to set the axis in a machining process which may machine chamfered areas 48 to re-form the seat angle and form threads 34 of the adapter after assembly to decrease runout of the assembled tool. Because no brazing is involved, the adapter hardness can be RC (Rockwell "C" scale) 20 or higher, preferably 25 or higher. Shank adapter hardness may range preferably from about RC 28 to about RC 30. Likewise, the drill 10 and drill shank 20 can be RC 60 or higher, preferably RC 65 or higher, and as high as RC 66. The drill shank should be harder than the adapter so that proper broaching is achieved during assembly.

Comparison tests have been run of no. 30 long NAS 965 type B drills in threaded shank drill assemblies made in accordance with the present invention and those made in accordance with the prior art. In these comparison tests, as reported in Table 2, runout of the threaded shank drill assemblies made in accordance with the present invention was considerably lower in both average, maximum and minimum values than the comparative sample drills. Additionally, although the torque measurement was limited by the device used to 100 inch pounds, the assembled threaded shank drills made in accordance with the present invention sustained significantly higher torque values before failure between the drill and adapter. Other tests have also shown the superior torque resistance of the assembled drill and shank made in accordance with the present invention over cylindrical drill shanks press fitted into adapter holes without broaching.

TABLE 2

COMPARISON TEST
30 LONG NAS 965 TYPE B DRILLS

| ITEM | PRESENT INVENTION RUNOUT | TORQUE | COMPARATIVE SAMPLE 1 RUNOUT | TORQUE | COMPARATIVE SAMPLE 2 RUNOUT | TORQUE |
|---|---|---|---|---|---|---|
| 01 | 0.0017 | 100+ IN/LBS | 0.0034 | 52 IN/LBS | 0.0045 | 60 IN/LBS |
| 02 | 0.0019 | 100+ IN/LBS | 0.0075 | 100+ IN/LBS | 0.0015 | 70 IN/LBS |
| 03 | 0.0048 | 100+ IN/LBS | 0.0027 | 100+ IN/LBS | 0.0087 | 70 IN/LBS |
| 04 | 0.0049 | 100+ IN/LBS | 0.0033 | 85 IN/LBS | 0.0031 | 35 IN/LBS |
| 05 | 0.0001 | 100+ IN/LBS | 0.0021 | 100+ IN/LBS | 0.0040 | 70 IN/LBS |
| 06 | 0.0032 | 90 IN/LBS | 0.0120 | 100+ IN/LBS | 0.0046 | 60 IN/LBS |
| 07 | 0.0022 | 100+ IN/LBS | 0.0005 | 75 IN/LBS | 0.0031 | 55 IN/LBS |
| 08 | 0.0019 | 100+ IN/LBS | 0.0210 | 100+ IN/LBS | 0.0018 | 65 IN/LBS |
| 09 | 0.0050 | 100+ IN/LBS | 0.0031 | 80 IN/LBS | 0.0034 | 75 IN/LBS |
| 10 | 0.0033 | 100+ IN/LBS | 0.0040 | 100+ IN/LBS | 0.0042 | 45 IN/LBS |
| 11 | 0.0025 | 100+ IN/LBS | 0.0010 | 100+ IN/LBS | 0.0063 | 30 IN/LBS |
| 12 | 0.0015 | 100+ IN/LBS | 0.0046 | 100+ IN/LBS | 0.0060 | 60 IN/LBS |
| 13 | 0.0014 | 100+ IN/LBS | 0.0066 | 75 IN/LBS | 0.0016 | 35 IN/LBS |
| 14 | 0.0017 | 100+ IN/LBS | 0.0033 | 100+ IN/LBS | 0.0033 | 70 IN/LBS |
| 15 | 0.0013 | 90 IN/LBS | 0.0044 | 100+ IN/LBS | 0.0049 | 70 IN/LBS |
| 16 | 0.0029 | 100+ IN/LBS | 0.0015 | 100+ IN/LBS | 0.0030 | 70 IN/LBS |
| 17 | 0.0023 | 100+ IN/LBS | 0.0040 | 100+ IN/LBS | 0.0020 | 60 IN/LBS |
| 18 | 0.0004 | 100+ IN/LBS | 0.0037 | 75 IN/LBS | 0.0053 | 45 IN/LBS |
| 19 | 0.0028 | 100+ IN/LBS | 0.0028 | 85 IN/LBS | 0.0039 | 70 IN/LBS |
| 20 | 0.0025 | 100+ IN/LBS | 0.0052 | 85 IN/LBS | 0.0046 | 75 IN/LBS |
| 21 | 0.0033 | 100+ IN/LBS | 0.0033 | 100+ IN/LBS | 0.0007 | 70 IN/LBS |
| 22 | 0.0024 | 100+ IN/LBS | 0.0017 | 100+ IN/LBS | 0.0078 | 45 IN/LBS |
| 23 | 0.0043 | 100+ IN/LBS | 0.0062 | 90 IN/LBS | 0.0113 | 70 IN/LBS |
| 24 | 0.0049 | 100+ IN/LBS | 0.0058 | 80 IN/LBS | 0.0063 | 65 IN/LBS |
| 25 | 0.0035 | 80 IN/LBS | 0.0078 | 100 IN/LBS | 0.0009 | 60 IN/LBS |
| AVER | 0.0027 | 98 IN/LBS | 0.0049 | 91 IN/LBS | 0.0043 | 60 IN/LBS |
| MAX | 0.0050 | 100 IN/LBS | 0.0210 | 100 IN/LBS | 0.0113 | 75 IN/LBS |
| MIN | 0.0001 | 80 IN/LBS | 0.0005 | 52 IN/LBS | 0.0007 | 30 IN/LBS |

MAXIMUM TORQUE MEASUREMENT ALLOWED BY TORQUE WRENCH USED IN THIS TEST: 100 INCH-/POUNDS
MAXIMUM RUNOUT ALLOWED BY NAS 965 FOR #30 DRILLS: .005"TIV
MINIMUM TORQUE REQUIRED BY NAS 965 FOR #30 DRILLS: 27.5 IN/LBS

As a result of the present invention drills of larger diameter can be press fitted in adapter then can be achieved by press fitting methods without broaching. Additionally, the straightening method used wherein the drill is used to center the assembled tool and adapter seat and threads are remachined after assembly is superior to other straightening methods used in the prior art, for example, induction heat straightening used on brazed threaded shank drills. Since there is no excessive heating used for straightening or brazing, there is also no need to surface treat the drill with oxide as in the prior art. Accordingly, a bright finish may be retained on the drill which, when drilling aluminum or similar metals, will yield superior results.

While this invention has been described with reference to specific embodiments, it will be recognized by those skilled in the art that variations are possible without departing from the spirit and scope of the invention, and that it is intended to cover all changes and modification of the invention disclosed herein for the purposes of illustration which do not constitute departure from the spirit and scope of the invention.

Having thus described the invention, what is claimed is:

1. A combination drill and drill adapter comprising:
   a drill having a shank portion for mounting the drill, the drill shank being generally cylindrical in shape and, at a portion adjacent to an end of the drill, a plurality of substantially flat sides parallel to the longitudinal axis of the drill forming voids in the cylindrical shape; and
   a drill adapter having a circular opening in one end for receiving the drill shank end portion and a mounting member at the opposite end for mounting the adapter in a drilling device, said adapter opening having a depth greater than the length of the substantially flat sides of the drill shank and having a first diameter at the portion of the opening away from said one end which is less than the diameter of the drill shank cylindrical portion and at least that of the diameter of a circle tangential to the sides at the end of the drill shank, said adapter opening further having a second diameter at the portion of the opening adjacent said one end greater than the first diameter,
   said drill shank end being assembled into said adapter opening such that the walls of said adapter opening at said first diameter are broached by the sides of said drill shank end and the walls of said adapter opening at said second diameter receive the drill shank cylindrical portion in a press fit without broaching to hold said drill securely in said adapter for mounting of the assembled drill and adapter in a drilling device.

2. The combination drill and drill adapter of claim 1 wherein said adapter mounting member is threaded.

3. The combination drill and drill adapter of claim 2 wherein said drill adapter has a hardness greater than about RC 20 and said drill shank has a hardness greater than about RC 60.

4. A combination drill and drill adapter comprising:
   a drill having a shank portion for mounting the drill, the drill shank being generally cylindrical in shape and, at a portion adjacent to an end of the drill, a plurality of substantially flat sides parallel to the longitudinal axis of the drill extending along at least a portion of the shank; and
   a drill adapter having a circular opening in one end with a depth greater than the length of the flat sides of said drill for receiving the drill shank end portion and a mounting member at the opposite end for mounting the adapter in a drilling device, said adapter opening having a first diameter at the portion of the opening away from the end less than the diameter of the drill shank cylindrical portion and greater than that of the diameter of a circle tangential to the sides at the end of the drill shank and a second diameter at the portion of the opening adjacent the end greater than the first diameter and slightly less than that of the the drill shank cylindrical portion, said drill shank end being assembled into said adapter opening such that the sides of said drill shank end broach walls of said adapter opening diameter away from the adapter end and the drill shank cylindrical portion fits against walls of the adapter opening at the second diameter adjacent to the adapter end without broaching to hold said drill securely in said adapter for mounting of the assembled drill and adapter in a drilling device.

5. The combination drill and drill adapter of claim 4 wherein said adapter mounting member is threaded.

6. The combination drill and drill adapter of claim 4 wherein said drill adapter has a hardness greater than about RC 20 and said drill shank has a hardness greater than about RC 60.

7. A method of assembling a drill and drill adapter comprising the steps of:
   a) obtaining a drill having a shank portion for mounting the drill, the drill shank being generally cylindrical in shape and, at a portion adjacent to an end of the drill, a plurality of substantially flat sides parallel to the longitudinal axis of the drill extending along at least a portion of the shank;
   b) obtaining a drill adapter having a circular opening in one end with a depth greater than the length of the flat sides of said drill for receiving the drill shank end portion and a mounting member at the opposite end for mounting the adapter in a drilling device, said adapter opening having a first diameter at the portion of the opening away from the end less than the diameter of the drill shank cylindrical portion and greater than that of the diameter of a circle tangential to the sides at the end of the drill shank and a second diameter at the portion of the opening adjacent the end greater than the first diameter and slightly less than that of the the drill shank cylindrical portion; and
   c) pressing said drill shank end into said adapter opening such that the sides of said drill shank end broach walls of said adapter opening at the first diameter away from the adapter end and the drill shank cylindrical portion fits against walls of the adapter opening at the second diameter adjacent to the adapter end without broaching to hold said drill securely in said adapter for mounting of the assembled drill and adapter in a drilling device.

8. The method of claim 7 further including after step (c) the step of threading said adapter mounting member.

9. The method of claim 7 further including after step (c) the step of finish machining said adapter.

10. The method of claim 7 wherein said drill adapter has a hardness greater than about RC 20 and said drill shank has a hardness greater than about RC 60.

11. A threaded shank drill for high torque loading applications comprising:
   an adapter portion having a hale of a predetermined diameter and depth in a first end and a threaded shank on a second end, opposite the first end, for mounting the drill in a drilling machine, said hole having a plurality of diameters with a larger diameter near the top of the hole and a smaller diameter near the bottom of the hole; and
   a drill portion of hardness greater than the adapter portion having a cylindrical shape of a diameter slightly larger than said hole larger diameter with a drill tip at a first end and a plurality of sides around an opposite second end, the second end of the drill portion having corners at regions between the sides, said corners extending beyond the smaller diameter of said adapter hole,
   said drill portion second end being assembled into said adapter opening such that the corners of said drill portion second end broach walls of said adapter hole at the smaller diameter near the bottom of the hole and the cylindrical drill portion fits against walls of the adapter hole at the larger diameter at the top of the hole without broaching to hold said drill portion securely in said adapter for mounting of the assembled drill and adapter portions in a drilling device.

* * * * *